(12) United States Patent
Boys

(10) Patent No.: US 7,817,621 B2
(45) Date of Patent: Oct. 19, 2010

(54) MOBILE WIRELESS INTERNET PORTABLE RADIO

(76) Inventor: Donald Robert Martin Boys, 22173 Carlie Dr., Bella Vista, CA (US) 96008

( * ) Notice: Subject to any disclaimer, the term of this patent is extended or adjusted under 35 U.S.C. 154(b) by 985 days.

(21) Appl. No.: 11/182,458

(22) Filed: Jul. 15, 2005

(65) Prior Publication Data

US 2006/0007923 A1    Jan. 12, 2006

Related U.S. Application Data

(62) Division of application No. 09/855,819, filed on May 14, 2001, now Pat. No. 7,301,939, which is a division of application No. 09/182,950, filed on Oct. 29, 1998, now Pat. No. 6,314,094.

(51) Int. Cl.
*H04L 12/66* (2006.01)
*H04L 12/28* (2006.01)
*H04M 3/00* (2006.01)

(52) U.S. Cl. .................. 370/352; 370/401; 455/419

(58) Field of Classification Search ............. 370/352, 370/401; 379/93.07; 455/3.01–3.06, 186.1, 455/418–420, 412; 705/26, 27, 51; 725/91, 725/134; 709/217–219
See application file for complete search history.

(56) References Cited

U.S. PATENT DOCUMENTS 5,564,001 A   10/1996   Lewis
5,572,643 A   11/1996   Judson
5,612,730 A   3/1997    Lewis
(Continued)

FOREIGN PATENT DOCUMENTS

EP       0 848 373 A2    6/1998
(Continued)

OTHER PUBLICATIONS http://windowsmedia.com/radiotuner/default.asp.*
(Continued)

*Primary Examiner*—Curtis Kuntz
*Assistant Examiner*—Mohammad K Islam
(74) *Attorney, Agent, or Firm*—Schwabe, Williamson & Wyatt, P.C.

(57) ABSTRACT

An Internet-capable radio has a communication port for connection to a modem, a connection function for connecting to the Internet upon user initiation while connected to the modem, sound circuitry for rendering audio data packets received over the Internet as analog audio output, and for delivering the audio output to one or more speaker ports, two or more stored hyperlinks addressing Internet broadcast servers; and a user input adapted to enable a user to select among the stored hyperlinks. Selection of one of the stored hyperlinks by the user input invokes the hyperlink and connects the radio to the server addressed by the hyperlink, initiating thereby an audio data stream as data packets from the broadcast server to the radio, and wherein the radio renders the data stream as analog audio data delivered to the one or more speaker ports. The user input in preferred embodiments has a plurality of pushbuttons associated with hyperlinks, which can be asserted by activating a pushbutton. In some embodiments a directory server is used for editing user profiles and programming connected Internet-capable radios.

14 Claims, 6 Drawing Sheets

U.S. PATENT DOCUMENTS

| | | | |
|---|---|---|---|
| 5,726,984 | A | 3/1998 | Kubler et al. |
| 5,778,181 | A | 7/1998 | Hidary et al. |
| 5,884,262 | A * | 3/1999 | Wise et al. ............... 704/270 |
| 5,905,865 | A * | 5/1999 | Palmer et al. ............ 455/3.1 |
| 5,926,789 | A | 7/1999 | Barbara et al. |
| 5,931,901 | A | 8/1999 | Wolfe et al. |
| 5,961,603 | A * | 10/1999 | Kunkel et al. ............ 709/229 |
| 5,974,043 | A | 10/1999 | Solomon |
| 5,977,963 | A | 11/1999 | Gaughan et al. |
| 5,977,964 | A | 11/1999 | Williams et al. |
| 6,005,563 | A | 12/1999 | White et al. |
| 6,009,363 | A * | 12/1999 | Beckert et al. ............ 701/33 |
| 6,009,469 | A | 12/1999 | Mattaway et al. |
| 6,012,086 | A * | 1/2000 | Lowell ..................... 709/218 |
| 6,018,710 | A | 1/2000 | Wynblatt et al. |
| 6,055,566 | A * | 4/2000 | Kikinis ..................... 709/219 |
| 6,138,036 | A | 10/2000 | O'Cinneide |
| 6,157,620 | A | 12/2000 | Danne et al. |
| 6,173,316 | B1 | 1/2001 | De Boor et al. |
| 6,249,810 | B1 | 6/2001 | Kiraly |
| 6,269,254 | B1 | 7/2001 | Mathis |
| 6,304,753 | B1 | 10/2001 | Hartmaier |
| 6,314,094 | B1 | 11/2001 | Boys |
| 6,317,784 | B1 * | 11/2001 | Mackintosh et al. ...... 709/219 |
| 6,330,244 | B1 * | 12/2001 | Swartz et al. ............. 370/401 |
| 6,349,329 | B1 * | 2/2002 | Mackintosh et al. ...... 709/219 |
| 6,381,320 | B1 | 4/2002 | Creamer et al. |
| 6,389,010 | B1 | 5/2002 | Kubler et al. |
| 6,587,684 | B1 * | 7/2003 | Hsu et al. .................. 455/419 |
| 6,654,367 | B1 * | 11/2003 | Kaufman ................... 370/356 |
| 6,732,112 | B1 | 5/2004 | Nagatomo et al. |
| 6,876,644 | B1 | 4/2005 | Hsu et al. |
| 6,993,004 | B2 * | 1/2006 | Boys ......................... 370/338 |
| 7,301,939 | B2 * | 11/2007 | Boys ......................... 370/353 |
| 2002/0059592 | A1 | 5/2002 | Kiraly |
| 2004/0022235 | A1 | 2/2004 | Vaziri et al. |
| 2007/0180063 | A1 | 8/2007 | Qureshey et al. |

FOREIGN PATENT DOCUMENTS

| | | |
|---|---|---|
| EP | 0848373 A2 | 6/1998 |
| EP | 0848373 A3 | 6/1998 |
| EP | 0863641 A2 | 9/1998 |
| EP | 0863641 A3 | 9/1998 |
| EP | 0918423 A2 | 5/1999 |
| JP | 9-330357 | 12/1997 |
| JP | 10-171733 | 6/1998 |
| JP | 10171842 | 6/1998 |
| JP | 10187408 | 7/1998 |
| JP | 10-285283 | 10/1998 |
| WO | 98/06037 | 2/1998 |
| WO | WO 98/22889 | 5/1998 |
| WO | WO 98/27542 | 6/1998 |
| WO | WO 98/30008 | 7/1998 |
| WO | WO 98/30008 A1 | 7/1998 |
| WO | WO 99/38266 | 7/1999 |
| WO | WO 99/38266 A1 | 7/1999 |
| WO | WO 00/27135 A3 | 5/2000 |
| WO | WO 01/05078 A2 | 1/2001 |
| WO | WO 01/05078 A3 | 1/2001 |
| WO | WO 01/65822 A2 | 9/2001 |
| WO | WO 01/65822 A3 | 9/2001 |

OTHER PUBLICATIONS http://www.adstech.com/products/cadet.html.*
http://www.adstech.com/products/cadet_what_is_rds.html.*
U.S. Appl. No. 09/855,819, Donald Robert Martin Boys.
Sakai Yasuharu et al., "Upcoming Multimedia Life to Houses, Cars and Airplanes," Part 2, In Moving Area, Appearance of Vehicle With Conversation on the Net and Flying Individual Theater, Nikkei Multimedia, Japan, 1998, 1. 15, No. 31, pp. 54-61.
Shin Kurihara, "Integration of Internet and Car Navigation System," Leading Edge of Car Navigation System With Communication Functions, Mobile Media Magazine, Japan, issued on Sep. 13, 1998, vol. 6 / No. 10, pp. 027-029.
Office Action dated May 17, 2005 for U.S. Appl. No. 09/906,631.
Amendment filed Jul. 27, 2005 for application U.S. Appl. No. 09/906,631.
Notice of Allowance and Examiner's Amendment dated Nov. 3, 2005 for U.S. Appl. No. 09/906,631.
Preliminary Amendment filed Jul. 9, 2008 for U.S. Appl. No. 11/333,893.
Office Action dated Sep. 15, 2008 for U.S. Appl. No. 11/333,893.
Response to Office Action dated Dec. 15, 2008 for U.S. Appl. No. 11/333,893.
Office Action dated Mar. 16, 2009 for U.S. Appl. No. 11/333,893.
Response to Office Action dated Jun. 9, 2009 for U.S. Appl. No. 11/333,893.
Office Action dated Jan. 3, 2000 for U.S. Appl. No. 09/182,950.
Amended Claims dated Apr. 6, 2000 for U.S. Appl. No. 09/182,950.
Office Action dated Jun. 21, 2000 for U.S. Appl. No. 09/182,950.
Office Action dated Aug. 21, 2000 for U.S. Appl. No. 09/182,950.
Amended Claims dated Jan. 17, 2001 for U.S. Appl. No. 09/182,950.
Notice of Allowance and Examiner's Amendment dated Apr. 10, 2001 for U.S. Appl. No. 09/182,950.
Response and Formal drawings submitted Apr. 23, 2001 for U.S. Appl. No. 09/182,950.
Response to interview summary dated Apr. 23, 2001 for U.S. Appl. No. 09/182,950.
Preliminary Amendment dated Jun. 4, 2001 for U.S. Appl. No. 09/855,819.
Office Action dated Mar. 18, 2005 for U.S. Appl. No. 09/855,819.
Response to Office Action dated Jul. 13, 2005 for U.S. Appl. No. 09/855,819.
Final Office Action dated Oct. 19, 2005.
Request for Continued Examination/Amendment dated Jan. 10, 2006 for U.S. Appl. No. 09/855,819.
Office Action dated Apr. 14, 2006 for U.S. Appl. No. 09/855,819.
Response to Final Office Action dated Jun. 14, 2006 for U.S. Appl. No. 09/855,819.
Supplemental Response to Final Office Action dated Jun. 15, 2006 for U.S. Appl. No. 09/855,819.
Office Action dated Aug. 28, 2006 for U.S. Appl. No. 09/855,819.
Appellant's Brief dated Oct. 18, 2006 for U.S. Appl. No. 09/855,819.
Resubmission of Appellant's Brief dated Nov. 10, 2006 for U.S. Appl. No. 09/855,819.
Office Action dated Feb. 14, 2007 for U.S. Appl. No. 09/855,819.
Response to Office Action dated May 14, 2007 for U.S. Appl. No. 09/855,819.
Preliminary Amendment dated Nov. 19, 2008 for U.S. Appl. No. 11/182,457.
Office Action dated Feb. 26, 2009 for U.S. Appl. No. 11/182,457.
Response to Office Action dated May 26, 2009 for U.S. Appl. No. 11/182,457.
Notice of Allowance for U.S. Appl. No. 09/855,819 mailed Jul. 20, 2007.
Office Action for JP2000-580395 mailed Feb. 3, 2004.
Final Office Action for JP2000-580395 mailed Sep. 6, 2005.
Notice of Rejection for JP2000-580395 mailed Feb. 10, 2009.
Supplemental Search Report for EP02747040 mailed Mar. 31, 2005.
Office Action for EP02747040 mailed Dec. 18, 2006.
Supplemental Search Report for EP99971619 mailed Jan. 21, 2005.
International Search Report for PCT/US99/025525 mailed Aug. 18, 2000.
International Search Report for PCT/US02/022639 mailed Dec. 6, 2002.
Office action for U.S. Appl. No. 11/182,457 mailed Jul. 15, 2009.
Final Office action for U.S. Appl. No. 11/182,457 mailed Mar. 8, 2010.
Final Office action for U.S. Appl. No. 11/333,893 mailed Aug. 31, 2009.
Office action for U.S. Appl. No. 11/333,893 mailed Jan. 19, 2010.

* cited by examiner

MOBILE WIRELESS INTERNET PORTABLE RADIO

The present application is a divisional application of divisional U.S. patent application Ser. No. 09/855,819 which was filed on May 14, 2001, now U.S. Pat. No. 7,301,939 which is a divisional application of U.S. patent application Ser. No. 09/182,950 which was filed on Oct. 29, 1998 and issued as U.S. Pat. No. 6,314,094 on Nov. 6, 2001. The disclosure of prior applications are incorporated herein in their entirety by reference.

FIELD OF THE INVENTION

The present invention is in the field of apparatus for receiving Internet Multimedia broadcasts including live broadcast audio and pertains more particularly to methods and apparatus for receiving and enabling wireless Internet radio for automobiles and mobile standalone devices.

BACKGROUND OF THE INVENTION

The World Wide Web (WWW), known as a subset of the well-known Internet is, at the time of this writing, the most accessible worldwide public information network. By accessing the Internet via a personal computer or other Internet-capable computerized appliance, one may obtain knowledge from virtually any network-connected source on Earth. Businesses, cultural centers, libraries, governments, cities, states, and private individuals maintain information pages, termed WEB pages in the art, that are stored on computers (file servers) that are adapted and dedicated to delivering such pages on request.

These WEB pages are typically written in hypertext mark-up language (HTML) and contain various forms of embedded interactive links, termed hyper-links in the art, created by authors using special software tools adapted for providing such content. Hyper-links are typically gateways to other parts of the page accessed another page on the same server, or a page on another server. From such a server one may download much information, including software and in some cases other multimedia content, to an Internet connected computer or appliance.

Among the types of media content one may find and access when browsing WEB pages, live audio and video is one of the most recently developed. Through the use of a browser (navigator) and additional software of the form of a multimedia player installed on one's PC or appliance, one may play audio, video, or a combination of the two while connected on-line and visiting a hosted WEB page. Connection to such broadcast servers, as they are termed in the art, typically result from interaction with an embedded hyper-link in the form of a graphic icon somewhere on a hosted WEB page, typically by means of a computer's pointer device.

Recently, traditional broadcast entities such as news, radio, sports networks, and the like have engaged in maintaining WEB pages wherein 24 hour live-streaming audio and video of real-time broadcasts and the like is made available to the general public through hyper-links to broadcast servers. By clicking on a provided hyper-link, one may connect to a server and monitor a particular offered broadcast if the user has an appropriate player for playing the downloaded stream.

While video portions of such live Internet broadcasts generally leave much to be desired in terms of quality due to (at the time of this application) limited bandwidth, audio streams can be heard with adequate quality on most personal computers operating standard modems and having standard line connection to the Internet. Of course, available bandwidth plays a major roll in both audio and video quality over a data-packet network such as the Internet. Other factors effecting quality of service include compression techniques, modem speeds, and so on. In current art, anyone with a 28.8 modem and standard Internet connection may listen to broadcast audio with adequate quality and minimum dropout in most instances.

One of the more notable developments in audio broadcasting over the Internet involves public and private radio station participation as previously described. For example, currently there are a variety of radio stations around the world that provide 24 hour broadcasting accessible from the Internet. Moreover, a growing number of Internet-only broadcasters are emerging. Before live broadcasting (streaming) of Internet multimedia, interaction with multimedia content was virtually limited to pre-stored feeds of audio and audio/video content such as interviews, news clips and short music clips.

In light of the above-described technological advances that have been achieved in live broadcast capability over the Internet, wherein any user with a PC and an Internet connection may participate, it is desirable to provide a means whereby mobile users such as a commuter in an automobile may access live Internet broadcasts from inside the automobile via a wireless connection without having to have an expensive multi-purpose PC to gain access.

With regards to PC and Internet capability from automobiles, users are conventionally limited to laptop computers for full multimedia access. Some companies provide Internet access from palm-top computers and cellular phones however the use is typically limited to accessing e-mails, networking with business associates (IP telephony) or the like. Some companies provide Internet access through a wireless PC for the purpose of providing map information for lost or stranded motorists, however such systems are dedicated only for that subscribed service and are limited to providing pre-stored information.

What is clearly needed is a dedicated mobile radio-receiving device that may be installed and operated from within a vehicle, and that can be used in conjunction with existing and future wireless Internet technologies whereby a motorist or other mobile user may maintain a wireless Internet connection via the device for the purpose of the recreational enjoyment of live audio broadcasting of national and/or international scope while driving. Such a system and apparatus would broaden the scope of radio advertising and broadcasting, increase local knowledge of international world events and culture, and thereby promote an international community awareness. Moreover, in the more diverse world we live in, where people spend more and more time in parts of the world distant from home, such world travelers can listen to radio stations based at home.

SUMMARY OF THE INVENTION

In a preferred embodiment of the present invention An Internet-capable radio is provided, comprising a communication port for connection to a modem; a connection function for connecting to the Internet upon user initiation while connected to the modem; sound circuitry for rendering audio data packets received over the Internet as analog audio output, and for delivering the audio output to one or more speaker ports; two or more stored hyperlinks addressing Internet broadcast servers; and a user input adapted to enable a user to select among the stored hyperlinks. With the Internet-capable radio connected by the communication port to the Internet, selection of one of the stored hyperlinks by the user input invokes the hyperlink and connects the radio to the server addressed by the hyperlink, initiating thereby an audio data stream as data packets from the broadcast server to the radio, and wherein the radio renders the data stream as analog audio data delivered to the one or more speaker ports.

In the Internet-capable radio the modem may be a wireless modem, and the Internet-capable radio connects to the Internet of a wireless data packet network. The radio may further comprise a display adapted to list hyperlinks and highlight a single hyperlink, wherein the user input comprises a button adapted to invoke the hyperlink highlighted.

In some embodiments the radio is programmed to access a specific directory server upon connection to the Internet, and to download a predetermined list of hyperlinks to Internet broadcast servers from the directory server. In other embodiments hyperlinks may be programmed through a user interface to the radio, manually, or through such as a serial port. The user input can be a plurality of pushbuttons, each pushbutton associated with a specific hyperlink, wherein activation of a pushbutton invokes the stored hyperlink.

In another aspect an Internet radio system is provided, comprising an Internet-connected directory server; and an Internet-capable radio comprising a communication port for connection to a modem, a connection function for connecting to the Internet upon user initiation while connected to the modem, sound circuitry for rendering audio data packets received over the Internet as analog audio output, and for delivering the audio output to one or more speaker ports, two or more stored hyperlinks addressing Internet broadcast servers, and a user input adapted to enable a user to select among stored hyperlinks and to invoke a selected hyperlink. In this system the Internet-capable radio connects to the directory server, the directory server provides hyperlinks to the Internet-capable radio, and upon assertion of a hyperlink the Internet-capable radio connects to the broadcast server associated with the asserted hyperlink, and downloads and plays the audio stream provided by the broadcast server.

In one embodiment of the system the Internet-capable radio comprises a display adapted for listing hyperlinks provided by the directory server, and the user input is operable for selecting and asserting individual ones of the hyperlinks displayed. The user input may comprise a plurality of pushbuttons and the directory server provides hyperlinks associated one-to-one with the plurality of pushbuttons.

In some embodiments as well the directory server stores a profile for individual users, the profiles editable by a user connected to the server on the Internet, and wherein profiles are automatically downloaded to a user's Internet-capable radio upon connection of the radio to the directory server. In other embodiments the directory server is coupled to a telephony call-in center, wherein a user may edit his/her profile by calling an agent at the call-in center, who in turn updates the user's profile on the directory server. In still other embodiments the directory server is coupled to a telephony interactive voice response (IVR) system, which interacts with a user by telephone to update a user's profile.

The Internet-capable radio and support systems for the radio provide new breadth to the art of Internet radio, by providing simple-to-use, relatively inexpensive Internet radios and systems.

BRIEF DESCRIPTION OF THE DRAWING FIGURES

DESCRIPTION OF THE PREFERRED EMBODIMENTS

According to an embodiment of the present invention, a wireless Internet service including a delivery system and an innovative mobile device adapted for receiving Internet broadcasts is provided and dedicated to providing mobile listeners with a capability to listen to live Internet broadcasts.

Figure 1:
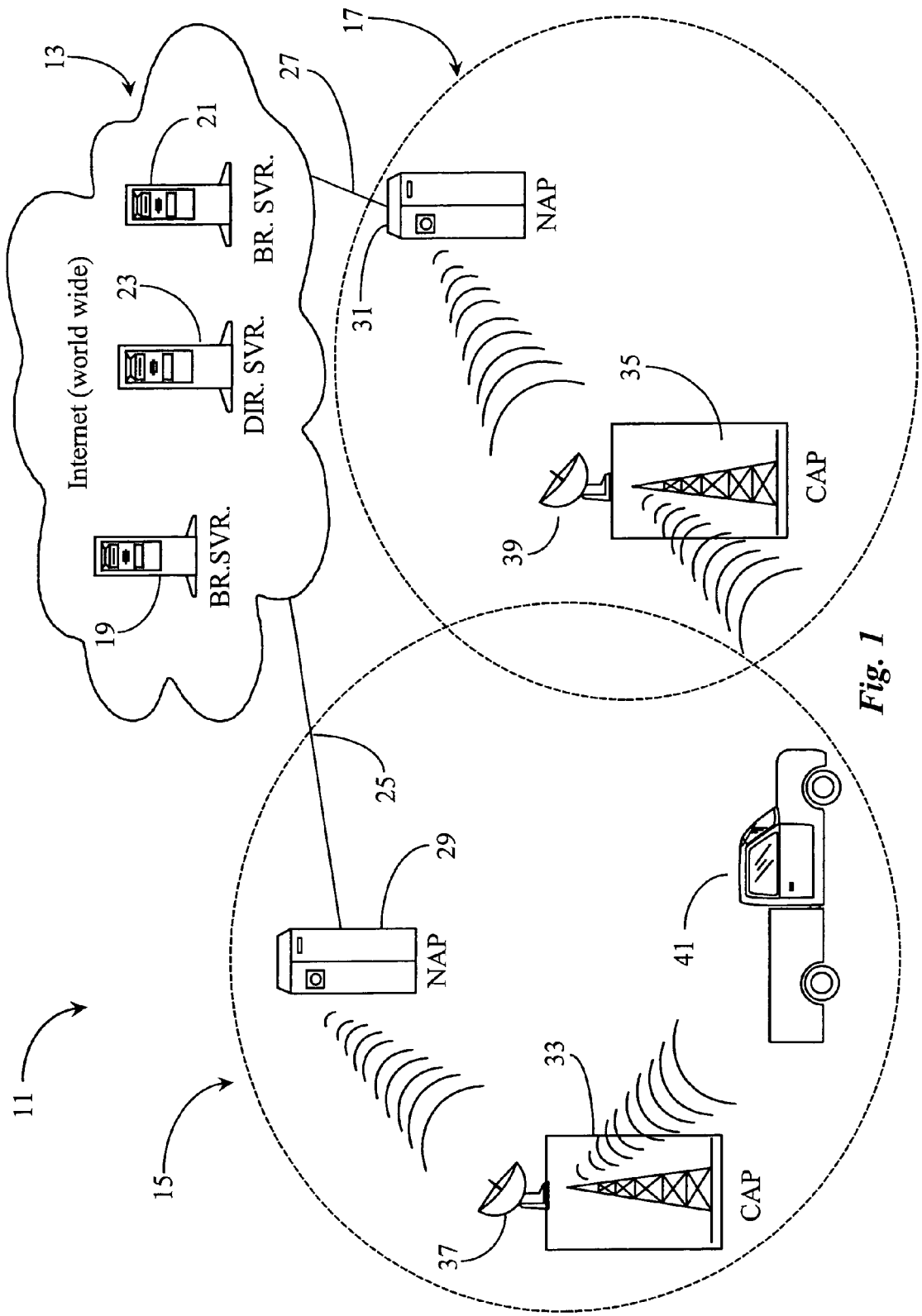
FIG. 1 is an overview of an Internet-connected wireless mobile-radio-broadcast system according to an embodiment of the present invention.

FIG. 1 is an overview of an Internet-connected wireless mobile-radio-broadcast system according to an embodiment of the present invention. A wireless Internet broadcast service 11 is provided and adapted to allow users having an innovative Internet radio device (not shown here but detailed in figures to follow) to connect to the Internet via wireless modem for the purpose of receiving broadcast audio content over a wireless network such as a wireless cellular system. Service system 11 comprises Internet network 13 and overlapping wireless-broadcast regions 15 and 17.

Service system 11 may be of the form of an Internet service using a wireless delivery system to which one may subscribe in order to receive audio broadcasts via the Internet and wireless link from radio stations around the world as well as other audio broadcasts from Internet-based sources. Access to service system 11 is, in a preferred embodiment, achieved via a unique computerized device termed an Internet radio by the inventor because of its dedicated nature. Such a device is not shown here but may be assumed to be present and installed in truck 41, and is described in enabling detail below. This Internet radio device is dedicated to establishing and maintaining a wireless Internet connection and receiving data packets via the wireless connection. More detail regarding this mobile Internet-radio device is provided below.

Internet 13 has connected therein in this embodiment a directory server 23 adapted for storing hyper-links to Internet-connected radio-broadcast servers such as broadcast servers 19 and 21, and to providing access to such broadcast servers upon request. Broadcast servers 19 and 21 are maintained by broadcast radio stations and the like and are adapted to delivering live audio over the Internet, the audio streams delivered typically mirroring the audio broadcast programming the same stations provide by RF multicast. Radio stations comprising music, news, talk, sports and other formats as well as Internet-based broadcasting entities may provide and maintain such connected broadcast servers as servers 19 and 21.

As previously described, service system 11 may use any known wireless delivery system for delivering content to a mobile user such as user 41 (illustrated as a truck having an Internet radio device installed therein). In a preferred embodiment, a well-known cellular service operating under well-known protocols such as cellular digital data packet (CDDP), and advanced cellular mobile services (ACMS) is used because of convenience and already-existing infrastructure. However, in other embodiments, other known wireless delivery systems may be utilized such as electromagnetic spectrum technology or microwave technology. In an alternative embodiment a proprietary wireless network dedicated solely to the purpose of the present invention may also be established. Regions 15 and 17 represent overlapping areas of wireless service such as are known with cellular technology broadcast from distributed stations. The only requirement for a delivery service in the present invention is that the service supports Transfer Control Protocol/Internet protocol TCP/IP (well known Internet transmission protocol), or other known Internet transmission protocols.

Region 15 comprises a network access point (NAP) 29 connected to Internet 13 via a connection line 25, and a customer access point (CAP) 33 which is capable of wireless two-way communication with NAP 29 via a (typically) satellite sending and receiving unit 37. User 41, having an Internet radio device according to an embodiment of the present invention, maintains Internet connection through CAP 33 while in the broadcast region of CAP 33. It will be apparent to one with skill in the art that there will be more than one CAP such as CAP 33 strategically distributed throughout a region such as region 15 than is illustrated herein. The inventor has chosen to illustrate only one such CAP 33 and deems it sufficient for the purpose of adequately explaining the present invention. In actual practice, as is known in the art of cellular service, the number of CAP's such as CAP 33 will define the geographic size of a region, such as region 15 or region 17. Also well known in the art is the fact that individual regions of coverage of each CAP overlap to provide the extent of the region.

Region 17 comprises components like those illustrated in region 15, namely, a NAP 31 connected to Internet 13 via a connection line 27, and CAPs 35 capable of wireless two-way communication via a (typically) satellite sending and receiving unit 39. Region 17 and region 15 are illustrated as overlapping as is consistent with known cellular service regions. In this embodiment, user 41 may leave one region such as region 15 and enter a second region such as region 17 without losing Internet connectivity via known service-connection transfer methods for maintaining connection to a "roaming" mobile user. Connection lines 25 and 27 may be of the form of optical digital carriers, or other well-known data-connection lines.

In a preferred embodiment of the present invention, user 41 subscribes to a wireless service dedicated to maintaining open Internet connections at NAP's such as NAP 31 of region 17. Such a service would use channels dedicated for Internet radios such as one presumed to be installed in the truck driven by user 41. Such channels would not typically be used for telephony or other Internet interaction so those Internet radio devices may be kept economical, compact and dedicated. Internet connectivity is achieved via wireless modem as is known in the art for traditional computers such as laptop or palmtop computers. The architecture and components of the previously mentioned Internet-radio device will be provided in enabling disclosure below.

Figure 2:
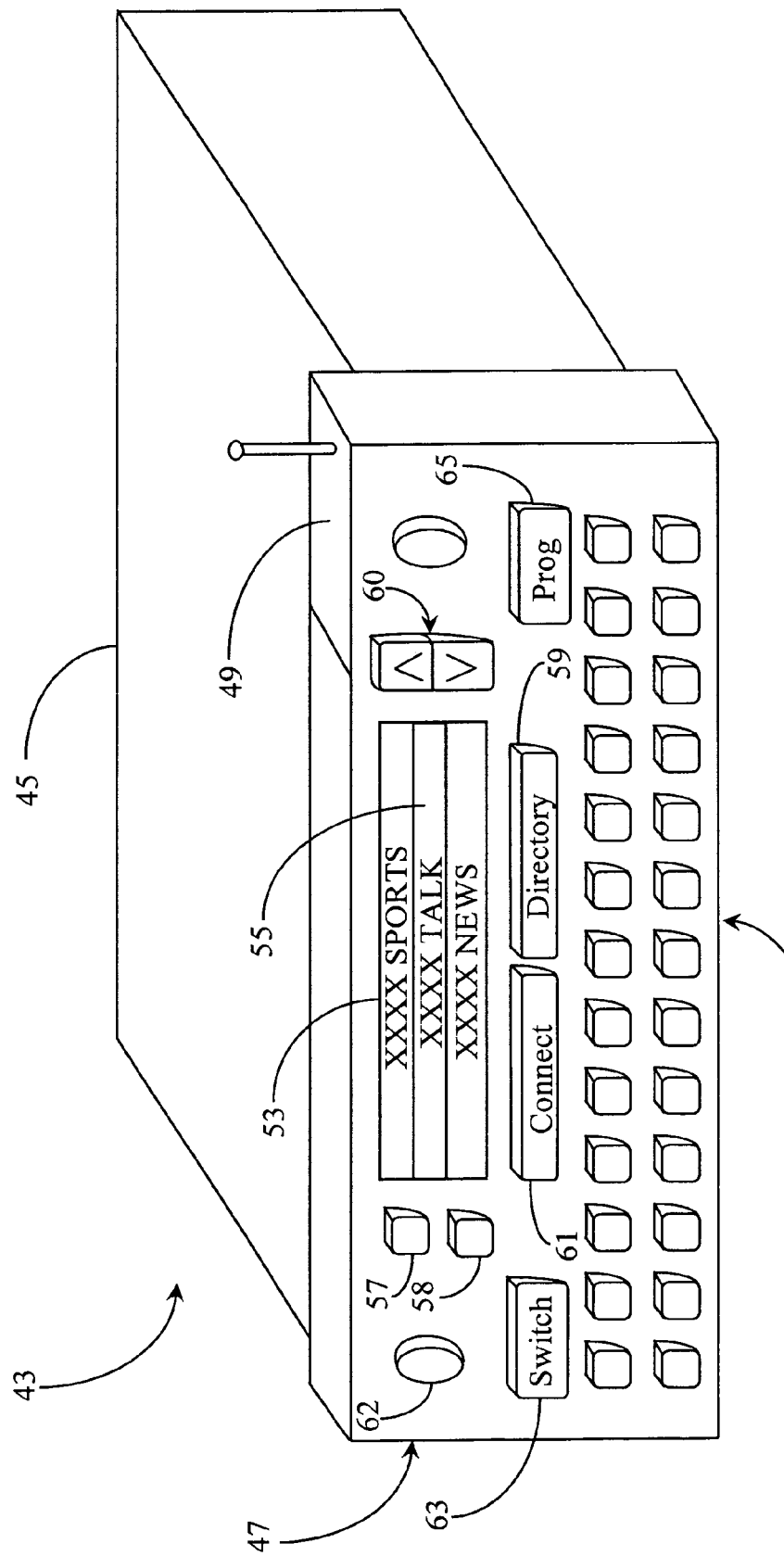
FIG. 2 is a perspective view of an Internet-capable radio device according to an embodiment of the present invention.

FIG. 2 is a perspective view of an Internet-radio device 43 according to an embodiment of the present invention. Device 43 is provided and adapted for the purpose of establishing and maintaining a wireless-mobile Internet connection for downloading live audio from various Internet-connected broadcast servers such as servers 19 and 21 of FIG. 1. Internet-radio 43 comprises housing 45 and a control-interface structure 47. Housing body 45 is of size and shape to allow for traditional in-dash mounting as is done with AM/FM RF in-dash radios. Control interface 47 comprises various user-accessible controls and is made to be accessible to the user in the same manner as a conventional in-dash radio. In alternative embodiments other mounting techniques may be employed such as above or below-dash mounting.

Internet radio 43 in this embodiment has a suitable display window 53, adapted to providing the user a view of the time and date as well as other information such as displayed radio stations and the like. Display window 53 may be a liquid crystal display (LCD), or another known type of display window. A scroll-up/scroll-down button 60 is provided and adapted for controlling a highlighter bar 55 that may be manipulated up or down to highlight selected stations that may be displayed in display window 53. Three representative radio stations are shown as displayed and viewable in window 53. These are for example purposes only, XXXX sports, XXXX talk, and XXXX news. The addresses of these and other audio-broadcast sources offering both live and/or stored content are accessible from an Internet directory server such as server 23 of FIG. 1 through Internet connection as previously described. As displayed, the representative radio stations just described are actually hyper-links to broadcast servers such as servers 19 and 21 of FIG. 1.

A wireless modem 49 is provided and configured for Internet access over a wireless network as previously described. In this example, modem 49 is illustrated as built conveniently into Internet radio 43. However, modem 49 may be a separate unit mounted at a convenient location within a vehicle. Modem 49 may, in one embodiment, be activated as soon as a user starts his or her vehicle and power is supplied to Internet radio 43. However in this particular embodiment, a connect button 61 is provided and adapted to activate modem 49 for the purpose of establishing an Internet connection as is known in the art.

A directory button 59 is provided and adapted to initiate contact with a directory server, upon user initiation, which lists available radio-links, such as server 23 of FIG. 1. In a preferred embodiment, connection to a directory server such as server 23 of FIG. 1 would be automatic after establishing an Internet connection. In alternative embodiments a directory server is not required, and a user may program addresses (URLs) directly into the Internet radio. The user can access such URL information from any conventional source. The directory server makes the task easier.

An array of selection buttons 51 is provided and adapted to provide a user with individual one-touch connection capability to individual radio-stations providing content via connected broadcast servers such as servers 19 and 21 of FIG. 1. In this example, there are 26 available selection buttons 51; however, there may be more or fewer such selection buttons without departing from the spirit and scope of the present invention. A program button 65 is provided and adapted for allowing a user to program selected radio stations to each of selection buttons 51 similar to program buttons offered in conventional car radios. URLs (hyperlinks) are stored for preferred stations and associated with buttons 51. Upon user selection the associated URL is asserted, and connection is thus made to the broadcast server having that URL as Internet address, which action immediately downloads the audio stream broadcast by that server.

An instant play button 57 is provided and adapted to allow a user to sample a highlighted radio link such as XXXX TALK, which, in this embodiment is highlighted via bar 55. An automatic sample button 58 is provided and adapted to allow a user to initiate a sample sequence wherein each radio link appearing in display widow 53 may be connected to and played for a pre-determined time such as perhaps a few seconds or minutes before moving on to the next available link. This is the familiar scan process used with conventional radios.

Volume and speaker balance buttons 62 (one on each side) are provided for controlling audio parameters such as base, treble, balance, volume, etc. A switch-program button is provided and adapted for the purpose of switching the dedicated function of selection buttons 51 from one-touch radio links to an input-interface-button array for programming parameters into Internet radio 43 such as the date and time, modem numbers, access numbers, protocol preferences, or the like. Numbers and/or symbols (not shown) may be provided on the faces of selection buttons 51 to aid in input function. In one alternative embodiment a user may use this programming feature to program hyperlinks directly into the radio.

According to a preferred embodiment of the present invention, Internet radio 43 is operated much like a traditional car stereo radio in that programming using memory may be accomplished in order to link certain buttons such as selection buttons to various radio links to establish one-touch connection to such links. For example, by connecting to a directory server such as server 23 of FIG. 1 and scrolling through listed station links via scroll panel 60, a user may depress program button 65 when a desired link is highlighted. By subsequently pressing one of selection buttons 51, the desired link is cached in memory and assigned to that particular button. Thereafter, a user may simply press the now-programmed button to establish connection to the desired link.

Radio links are actually hyper-links to broadcast servers such as servers 19 and 21 of FIG. 1, which when activated, cause Internet radio 43 to establish connection to such servers and begin downloading and playing audio content offered in association with that particular server. Internet radio 43 is enabled, by virtue of installed software, to make such one-touch connections which are similar only in appearance of operable method to one-touch radio programming offered in conventional car stereos. Differences are that Internet 43 operates in a switched-data-packet environment instead of broadcast radio-wave frequencies, and that the method of content receiving involves software in addition to wireless receiving capability whereas conventional radios are simply tuned to receive via a radio receiver.

Some of the advantages offered with Internet radio 43 are, that in addition to local stations, Internet radio 43 is capable of playing any broadcast station located anywhere in the world as long as the station in question broadcasts over the Internet. For example, individuals far from home in, for example, a foreign country, may listen to hometown radio in any language desired.

As previously described, Internet radio 43 works with a wireless network such as a cellular network, and a wireless modem such as modem 49 (preferred embodiment). Service system 11 may be hosted by a network provider in cooperation with device manufacturer similar to cell-phone company arrangements. Charges to subscribers may be supplemented by individual radio stations motivated by attracting people into an area or simply by increased ratings. Advertising done by such stations may change to a more national or even a global scope. Moreover, advertising can now be tailored to individuals and groups by demographics rather than all multicasts, by virtue of the fact that each user has a unique IP address for selectively receiving packets from the wireless Internet simulcast. Commercials can be substituted, for example, regionally, so a user in San Francisco listening to a radio station in Moscow, Russia, may still get commercials for local San Francisco businesses.

Internet radio 43 has software installed therein for the purpose of enabling Internet connection and downloading and playing broadcast content. More detail regarding such software and enabling circuitry is provided below.

Figure 3:
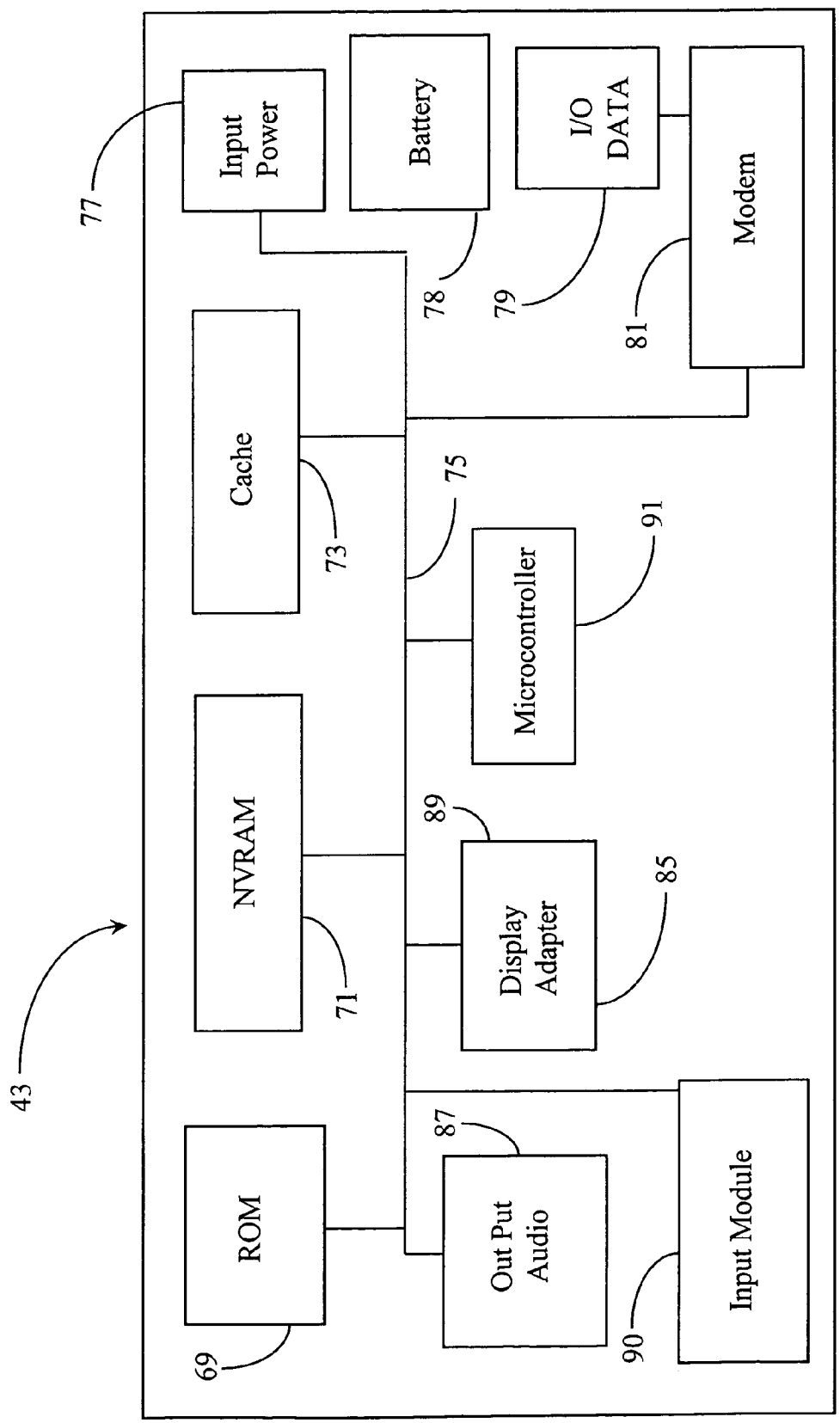
FIG. 3 is a block diagram illustrating internal circuitry of the Internet radio device of FIG. 2.

FIG. 3 is a block diagram illustrating internal circuitry of the Internet radio device of FIG. 2. Internet radio 43, as a dedicated and computerized device, contains certain elements known in the art present in typical computer devices for the purpose of enabling operable function. The inventor intends that the block diagram represented herein be construed as exemplary only with regards to description of such elements as it will be apparent to the skilled artisan that such basic elements are known in the art and common to many differing types of computerized devices, and also that many of the elements can be combined in various ways.

Internet radio 43 has a microcontroller 91 for overall management of Internet radios 43. Microcontroller 91 provides management via a bus structure 75, which may be a simple serial bus, but is preferably a parallel bus structure as known in the art. Also connected to bus structure 75 is a read-only memory (ROM) 69 for containing such as boot instructions and basic operating instruction (BIOS). A non-volatile random-access-memory (NVRAM) 71 is provided and contains such as a compact operating system, an innovative Internet browser application, an audio player application, modem software, and communication protocol software.

A cache memory 73 is provided and adapted to contain such as stored Internet locations (URL's), and other temporary and some semi-permanent information such as accessed and stored radio link locations and radio link locations that may be generic to a browser. In this embodiment, cache 73 may be a browser cache or a shared system cache.

An input power port 77 provides a port for connecting Internet radio 43 to a provided power source, such as the electrical system of a vehicle. A rechargeable battery unit 78 is provided as a secondary source of power so that Internet radio 43 may be operated with the car turned off without using up car battery resource, or to allow the radio to be removed and used outside the vehicle. Connections to battery 78 are not illustrated, but are assumed to be present such as circuitry providing a switch capability between a car battery source and battery 78 as a secondary source. Such circuitry is well known I the art.

Also connected to bus structure 75 are modem circuitry 81 (analogous to modem 49 of FIG. 2) and an I/O data-modem port 79 (shown connected to modem 81) which contains circuitry required for receiving and sending in wireless mode as previously described. Modem 81 may be built-in (internal) or held separately (external) as previously described.

A display adapter (driver) module 89 is provided and includes circuitry required to operate display window 53 of FIG. 2. An output module 87 is provided and contains circuitry (sound card) adapted to enabling audio to be heard via a connection to speaker units. An input module 90 is provided and contains required circuitry for enabling data input to Internet radio 43 while switched to input mode as previously described with reference to FIG. 2. Display module 89, output module 87, and input module 90 is also connected to bus structure 75.

It will be apparent to one with skill in the art that the internal components of Internet radio 43 as described herein may vary in other embodiments without departing from the spirit and scope of the present invention. For example, some memory may be provided in the form of removable cards as is known in the art. Memory may also be provided in the form of a RAM/ROM mix in addition to NVRAM. Added functions may require additional modular components while an Internet radio of a simplest form may require fewer components. The only requirement for internal architecture is that it contains basic elements that allow for booting the device, and controlling the basic dedicated functions and operations of Internet radio 43.

Figure 4:
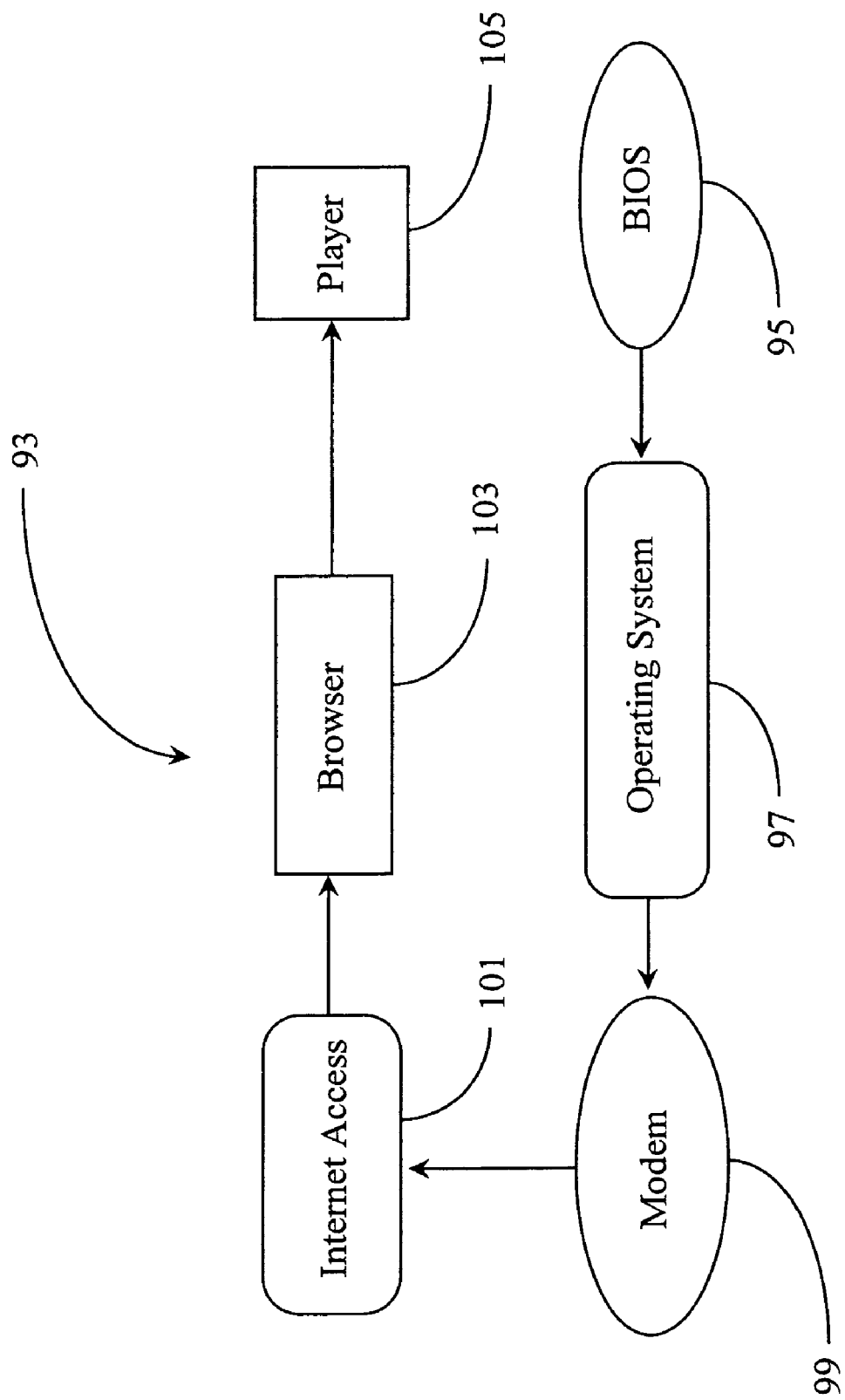
FIG. 4 is a block diagram illustrating software capability of the Internet radio device of FIG. 2.

FIG. 4 is a block diagram illustrating software capability of the Internet radio device of FIG. 2. A software package 93 is provided and adapted for enabling basic function and operation of Internet radio 43 according to an embodiment of the present invention. The inventor intends that package 93 and components thereof be construed as exemplary as other embodiments may contain differing components.

A system BIOS 95 is provided and adapted for booting up Internet radio 43. In this case, BIOS 95 may be very basic in comparison to BIOS systems found in more complex computers having varied functions. BIOS 95, in this embodiment, are limited to booting to a mini-operating system 97. Mini-operating system 97 contains minimum functionality as may be required for operating other dedicated components such as a modem application 99, an Internet access application 101, an audio browser application 103, and an audio player application 105.

Operating system 97 may be a modified (stripped down) version of a known operating system such as Windows CE™. In another embodiment, operating system 97 may be provided in the form of a new proprietary system dedicated for the purpose of enabling Internet radio according to an embodiment of the present invention. Operating system 97 contains all of the necessary communication drivers and system components needed to work with other installed components according to media and system protocols.

Modem software 99 contains all of the necessary components for operating a modem such as modem 49 of FIG. 1. Modem speeds and other protocols may vary according to implementation and exact model or brand of modem however a minimum modem speed of 28.8 kps is sufficient for downloading Internet radio. In a simple embodiment, modem 99 is equipped solely for accessing the Internet via wireless mode as previously described.

Internet access software 101 is a basic application that, in one embodiment, may be incorporated or integrated with browser 103. As a basic application, Internet access software 101 provides simple and direct connection to a directory server such as server 23 of FIG. 1, or connection to a service provider. This software may be a stripped down version of known software, or a created module dedicated to the function of the present invention.

Audio browser 103 as described above may be integrated with Internet access software 101. Browser 103 will access Internet sources through URLs, but does not display web pages like conventional browsers. E-mail or news group connections, password routines and typical browser features are not required. The browser's principle function is to contact a directory server such as server 23 of FIG. 1 and to activate a hyper-link (radio-link) thereby causing download and playing of audio content, or, in an alternative embodiment, to directly assert a pre-programmed hyperlink to go directly to audio content at a broadcast server. The only display provided by browser 103 is names of radio-links, or, in some case pseudo-names, as listed in a directory server. Although this may be loosely construed as a web page, only hyper-links are displayed and not additional media or graphics. Actual downloading procedure may be limited or adjusted as to how many links are displayed at a time. For example, a page containing 200 links may be downloaded and displayed 5 links at a time. In another embodiment, all of the links may be downloaded and displayed in scrollable fashion. Software player 105 may be an existing player (known in the art) or a created player dedicated to playing only audio according to an embodiment of the present invention.

It should be noted here that software package 93 is preferably limited in function so that only components required to achieve the object of the present invention, namely, accessing the Internet for the purpose of downloading and playing broadcast audio content, are included. In this way, memory required to store software package 93 is kept to a minimum. In one embodiment, software package 93 may be provided as a single installable component containing only basic elements of each described sub-component such as browser 103 and so on. In another embodiment, individual components may be provided in separately installable forms.

As memory storage techniques improve and bandwidth capability increases over the Internet, more functionality may be provided to Internet radio 43 such as video capture and play capability. In this case, a more suitable display would be provided for showing video with sound. In this future embodiment, Internet broadcast television may be received in the same fashion as Internet broadcast radio is received according to an embodiment of the present invention. It should be noted here that TV stations are currently broadcasting over the line Internet, however, much more bandwidth is required to achieve a decent dynamic picture. Therefore, the inventor deems that a dedicated Internet-radio device such as Internet radio 43 of FIG. 1 wherein only audio is captured represents the present invention according to a preferred embodiment. That is not to say however, that other embodiments including added function such as e-mail and IP telephony could not be practiced according to other aspects of the present invention.

An innovative function of audio browser 103 involves accessing a hyper-link and activating it with one initiation action provided by a user. This may be accomplished via writing the capability into the browser software. For example, each hyper-link (radio station) has a URL or server address. In an embodiment such as described herein where a directory server is used only radio hyper-links are provided and displayed. Therefore, browser 103 simply follows the link highlighted by the user via a scroll method such as by scroll panel 60 and highlighter bar 55 of FIG. 2. When a user is highlighting a specific link, browser 103 is reading that link. However, after programming all of the radio-links to selection buttons such as described with reference to FIG. 2, one touch to one of these buttons asks browser 103 to find the appropriate link and then to activate it.

This is where cache memory 73 of FIG. 3 comes in to play. Once a link is programmed to a selection button such as to one of selection buttons 51, then a copy of that link is cached in cache memory 73 and listed as assigned to that button. When browser 103 is activated via button selection, it recognizes the link as cached and associated with the particular button. Browser 103 may then contact directory server 23 and subsequently access the appropriate link in that server thereby causing connection to an associated broadcast server such as server 21 of FIG. 1 for downloading and playing the audio stream.

In an alternate embodiment of the present invention, a directory server listing hyper-links would not be required. In this embodiment, radio stations and like broadcasters maintains their own WEB pages with hyper-links to live broadcasts. Of course the same may also be true when using a directory server as access to these links may be made by conventional line equipment such as a personal computer. Directory server 23 merely gathers such links into one location for easy access. If however, no directory server is provided, then browser 103 may be enhanced with a search engine dedicated to isolating WEB addresses that contain these hyper-links. Such WEB page URL's may be displayed in scrollable fashion within window 53 of FIG. 1. Such pages will typically be a WEB page hosted by a particular broadcaster such as a radio station.

When a user highlights a selection via highlighter bar 55 and presses instant play button 57, browser 103 will navigate to the URL and display only the audio hyper-links on that page. For example, if only one hyper-link exists on that page, which is most often the case, then browser 103 will automatically activate that link causing connection to an associated broadcast server for download and playing of live broadcast. If two or more hyper-links to audio content exist on one page, then they may be scrolled and activated as previously described, or sampled one at a time for a predetermined amount of time.

If a user chooses one link, for example through activation of program button 65 of FIG. 1, then that link is cached and assigned as before. At this point, a one-touch selection may activate that hyper-link, as its network path is now known. Moreover, identification and differentiation of audio hyper-links from other server links such as banner adds and the like can be made by browser 103 through an enhancement allowing for identification of code that must be embedded in an audio link for invoking player software. The inventor knows of no such browser with the capability of disseminating or reading embedded code for the purpose of differentiating between separate embedded links.

Figure 5:
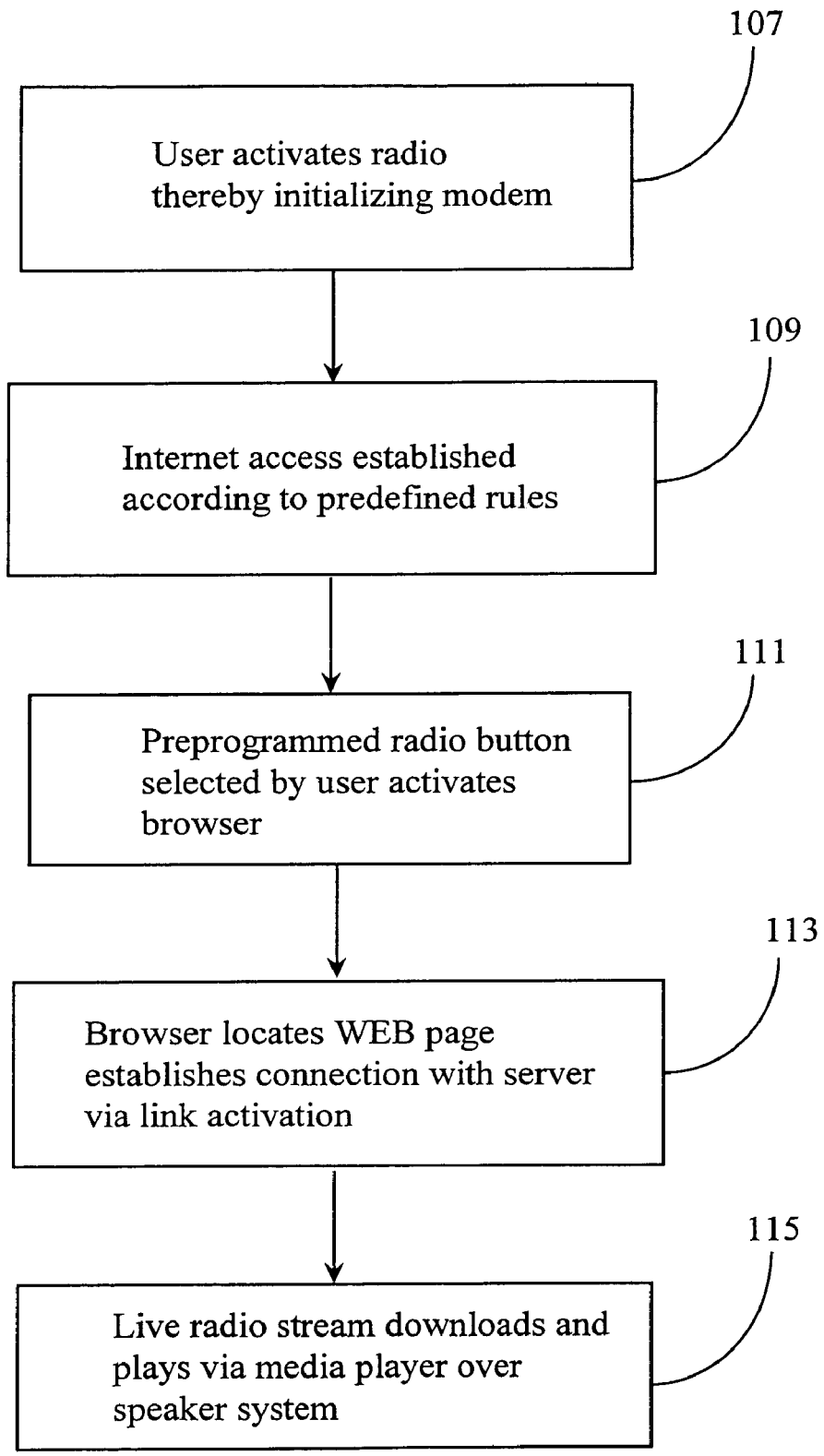
FIG. 5 is process flow diagram illustrating logical user steps for accessing live Internet radio according to an embodiment of the present invention.

FIG. 5 is process flow diagram illustrating logical user steps for accessing live Internet radio according to an embodiment of the present invention. In step 107, a user such as user 41 of FIG. 1 activates or powers on an Internet radio such as radio 43 of FIG. 2, thereby initiating Internet connection. Internet connection may be initiated automatically when a user turns on his vehicle, or at the user's discretion such as by activating a connect button such as button 61 of FIG. 2. In step 109, Internet access is established according to pre-defined rules. Access may be through an ISP or wireless network provider.

In step 111, a user may select a pre-programmed button such as one of selection buttons 51 of FIG. 2 to activate a browser such as browser 103 of FIG. 4 for the purpose of acquiring audio content. In step 113, the browser locates the WEB page containing the associated hyper-link and activates the link causing navigation to and download of audio broadcast from an associated broadcast server such as server 21 of FIG. 1. In step 115; broadcast audio downloads to Internet radio 43 and plays over a suitable speaker system.

It will be apparent to one with skill in the art that the above described steps represent a basic example of a sequence of initiation events and automated functions that enable audio content sourced from the Internet to be downloaded and played on an Internet radio such as radio 43 of FIG. 2. It will also be apparent to one with skill in the art that such steps may vary somewhat depending upon user desire and unit capability. For example, instead of selecting a pre-programmed button as in step 111, a user may instead play content via scroll panel and instant play button as described with reference to FIG. 2.

Figure 6:
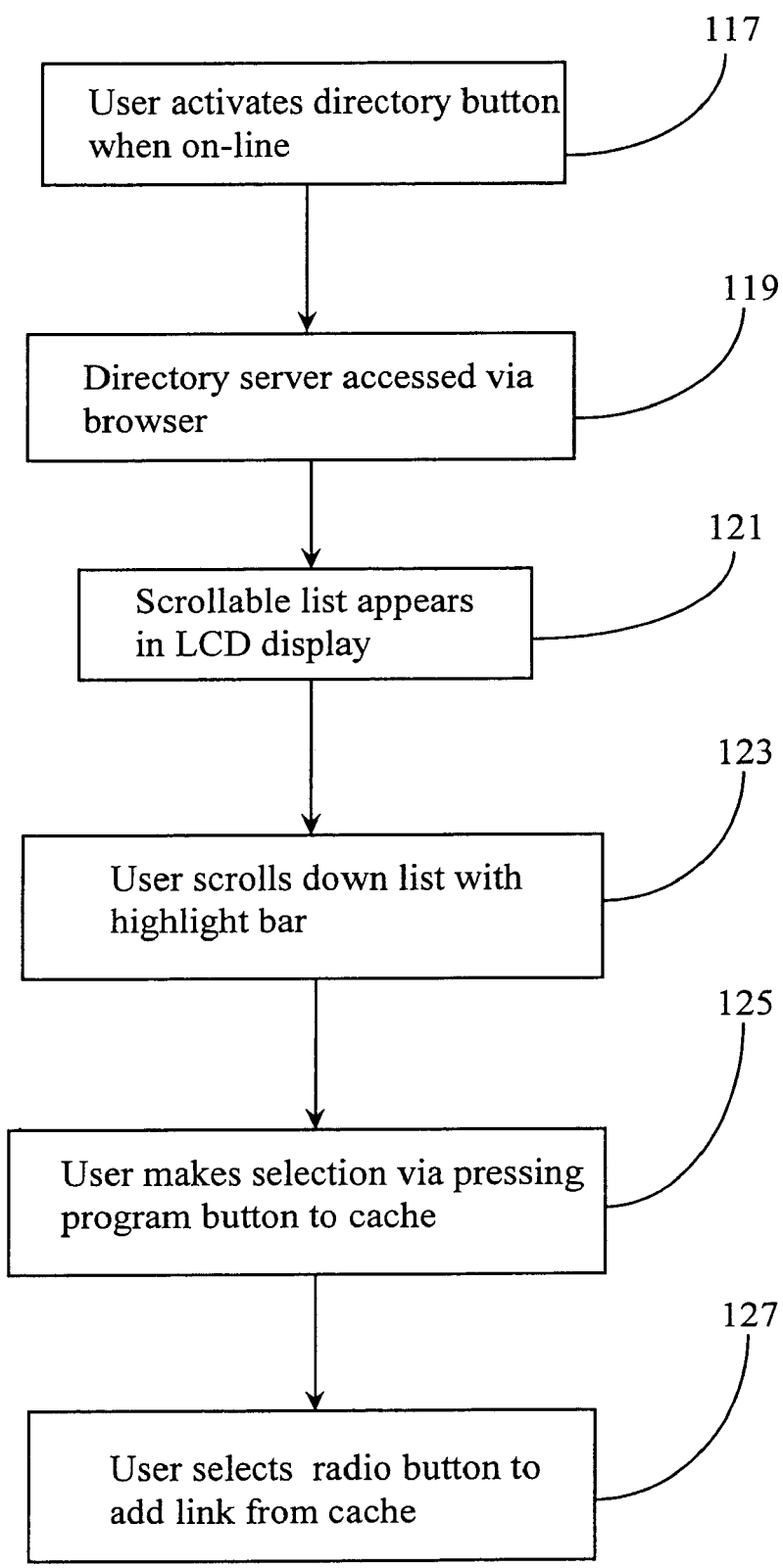
FIG. 6 is a flow chart illustrating programming steps used with the Internet radio device of FIG. 2.

FIG. 6 is a flow chart illustrating programming steps used with the Internet radio device of FIG. 2. In step 117, a user activates a directory button such as button 59 of FIG. 2 while connected to the Internet. This may be automatic in an embodiment wherein a directory server is a first location for a browser. In step 119, a directory server containing hyper-links such as server 23 of FIG. 1 is accessed via a browser such as browser 103 of FIG. 4. The hyper-links may be displayed in step 121. Downloading may progress in incremental units of a total contained on a page such as perhaps 4 or 5 links at a time with a next 4 or 5 links available upon request. In another embodiment, all of the links may be downloaded to Internet radio 43 and be displayed (step 121) in scrollable fashion in a window such as window 53 of FIG. 1.

At step 123, a user may scroll down a list of hyper-links with a highlight bar activated via a scroll panel such as bar 55 and panel 61 of FIG. 2. At step 125 a user makes a selection of a highlighted link via depressing a program button such as button 65 of FIG. 2. This copies the link to a cache such as cache 73 of FIG. 3. At step 127 a user may depress any one of selection buttons 51 of FIG. 2 to assign that button to the cached link. When ready, a user simply depresses the selection button again to go to that server and begin playing the associated broadcast audio.

It will be apparent to one with skill in the art that the above-described steps represent just one exemplary programming sequence for an Internet radio such as radio 43 of FIG. 2. Other programming steps or sequences are possible without departing from the spirit and scope of the present invention such as hitting the program button after listening to instant play via button 57, and so on. In addition to programming stations, other content may be programmed into Internet radio 43 such as time and date, perhaps an alarm function, input parameters related to configuration and set-up and the like.

In a preferred embodiment of the present invention, Internet radio 43 is intended to be a stand-alone mobile unit for automobiles. The scope of the invention, however, is broader than this one embodiment. For example, an Internet radio device such as device 43 may be provided of the form of a user-worn unit such as a head-set or belt attaching unit. In this embodiment, power would be provided by a compact rechargeable battery pack. In the case of a head-set, the battery pack and control panel may be worn on a belt or body-conforming brace.

In an alternate embodiment, a stand-alone Internet radio device such as device 43 may be provided as a wireless desktop or house system perhaps having a phone jack to enable line connection to the Internet as well.

In still another embodiment of the present invention the Internet radio has no display and operates without benefit of a directory server. In this embodiment the inventor recognizes that it is only necessary that the Internet radio be programmable such that one or more unique hyperlinks are programmed into the radio and associated with an initiation apparatus, so the hyperlinks may be selectively invoked.

There are several ways this programming may be done. The use of a convenient directory server, and user interface apparatus adapted to allow a user to select and initiate hyper-links and to associate hyperlinks with initiation buttons has already been described above. In an alternative embodiment a portable radio may be provided with a standard serial port, an infra red link, or other known link to a personal computer, such as a laptop or desktop computer. Suitable software may be executed on the computer to access information on the Internet, the information comprising hyperlinks to broadcast servers, and the software may be adapted also to allow a user to associate selected hyperlinks with a selection apparatus on the Internet radio, and to then download the associated hyperlinks to the radio.

In this alternative there is no need for a display. The Internet radio simply has a series of initiation buttons or a dial allowing selective actuation and a communication port t the host computer. Once selection of hyperlinks is made and downloaded to the Internet radio of the invention, the radio may be used independently, and will tune to the appropriate station each time the selection apparatus is exercised.

In yet another alternative, a user may contact a directory server from his/her Internet-connected general-purpose computer, and provide a client profile. The WEB page interface of the directory server provides the client with a listing of hyperlinks to radio servers or at least a facility for developing such a list, under the client's control. The client in this embodiment makes selection and association, and the directory server programs the Internet radio itself, the next time the Internet radio accesses the directory server. This provides a particularly simple Internet radio device.

In yet another alternative a call-center technology is used. The user calls an 800 (or similar no-charge number); establishing contact with an agent of the service and the agent guides the user through set-up. The user can inform the agent of specific desires in radio stations, the agent makes suggestions and provides samples, and the user selects stations and suggests assignment to specific slots at the radio. Once the list is complete, the agent enters the selections and associations in an internet-connected server, and the next time the user's radio connects the server programs the radio for the new play mix.

In yet another embodiment the no-charge-to-calling-party number connects the client by phone with an Interactive Voice response unit (IVR), and the IVR elicits the necessary information. Once selection and association is made via the IVR, the IVR automatically communicates same to an Internet-connected directory server, and the server does the rest. The next time the user accesses the Internet the server programs the Internet radio device for the stations and association.

In still another embodiment, an Internet radio such as radio 43 may include a means for recording Internet content such as via writeable CD-ROM or via tape recording deck. In a considerably more complicated embodiment AM/FM receiving capability may be added to the circuitry of Internet radio 43 for the purpose of creating a dual-purpose radio (Internet broadcast and conventional broadcast). The spirit and scope of the present invention is limited only by the claims that follow.

What is claimed is:

1. A vehicular radio, comprising:
a housing configured to be mounted inside a motor vehicle;
one or more components coupled to the housing and configured for wireless Internet communication;
one or more electronic components coupled to the housing for rendering a received audio data stream as electronic output;
one or more memory buttons disposed on the housing and associated one-to-one by a stored map with individual Universal Resource Locators (URLs) correspondingly associated with Internet radio broadcast data streams such that a single operation of any one memory button asserts the associated URL, causing the radio to receive the corresponding Internet radio broadcast data stream; and
at least one input, operation of which communicatively connects the radio to a directory server on the Internet to download one or more URLs of audio data from, and stored on, the directory server, the one or more downloaded URLs providing links to one or more broadcast servers that are separate from the directory server, wherein the radio is configured to associate each downloaded URL one-to-one with an individual one of the one or more memory buttons.

2. The vehicular radio of claim 1, wherein the one or more URLs comprise a list of URLs.

3. An Internet radio system, comprising:
an Internet-connected subscription server storing one or more subscriber lists of Universal Resource Locator (URL) Internet addresses of destinations that are separate from the subscription server and capable of streaming real-time Internet radio broadcasts to each of one or more subscribers based on the one or more subscriber lists; and
a vehicular radio mounted inside a motor vehicle, the radio comprising a housing, a wireless Internet connection component coupled to the housing, electronic components coupled to the housing and configured for render a received audio data stream as electronic output, and one or more memory buttons coupled to the housing, the one or more memory buttons associated one-to-one with one or more URLs, such that operating a memory button asserts the associated URL, causing the radio to receive the real-time Internet radio broadcast associated with that URL,
wherein the association between the one or more memory buttons and the one or more URLs is assignable and adjustable via Internet or telephone communication.

4. The system of claim 3, wherein each of the one or more subscriber lists is associated with a specific subscriber.

5. The system of claim 3, wherein the radio is configured to enable access to the subscription server to amend a subscriber's URL list.

6. The system of claim 3, further comprising a call center associated with the subscription server, through which a subscriber may call an agent and instruct the agent to amend a subscriber's URL list.

7. The system of claim 3, further comprising an automated voice-interactive telephone system associated with the subscription server through which a subscriber may call and interact with voice recognition software to amend a subscriber's URL list.

8. The system of claim 3, further comprising an Internet browser component and input enabling a subscriber to browse Internet web sites and to search accessed sites for links to streaming audio content.

9. A method comprising:
storing by a computing device one or more subscriber lists of Universal Resource Locator (URL) Internet addresses of destinations that are separate from the subscription server and capable of streaming real-time Internet radio broadcasts to each of one or more subscribers based on the one or more subscriber lists;
associating by the computing device the URLs individually on a one-to one basis with one or more memory buttons of a vehicular radio mounted inside a motor vehicle, such that operating a memory button asserts the associated URL, causing the radio to receive the real-time Internet radio broadcast associated with that URL,
wherein the association between the one or more memory buttons and the one or more URLs is assignable and adjustable via Internet or telephone communication.

10. The method of claim 9, further comprising changing by the computing device the association such that one or more of the memory buttons are associated with one or more different URLs.

11. The method of claim 9, further comprising enabling by the computing device a subscriber to browse Internet web sites and to search accessed sites for links to streaming audio content, wherein the browser searches a site by reviewing embedded code at the site for code to activate an audio player application identifying a link to streaming audio content.

12. An apparatus comprising:

means for storing one or more subscriber lists of Universal Resource Locator (URL) Internet addresses of destinations that are separate from the subscription server and capable of streaming real-time Internet radio broadcasts to each of one or more subscribers based on the one or more subscriber lists;

means for associating the URLs individually on a one-to-one basis with one or more memory buttons of a vehicular radio mounted inside a motor vehicle, such that operating a memory button asserts the associated URL, causing the radio to receive the real-time Internet radio broadcast associated with that URL, wherein the association between the one or more memory buttons and the one or more URLs is assignable and adjustable via Internet or telephone communication.

13. The apparatus of claim 12, further comprising means for changing the association such that one or more of the memory buttons are associated with one or more different URLs.

14. The apparatus of claim 12, further comprising means for enabling a subscriber to browse Internet web sites and to search accessed sites for links to streaming audio content, wherein the browser searches a site by reviewing embedded code at the site for code to activate an audio player application identifying a link to streaming audio content.

* * * * *